Figure 6:
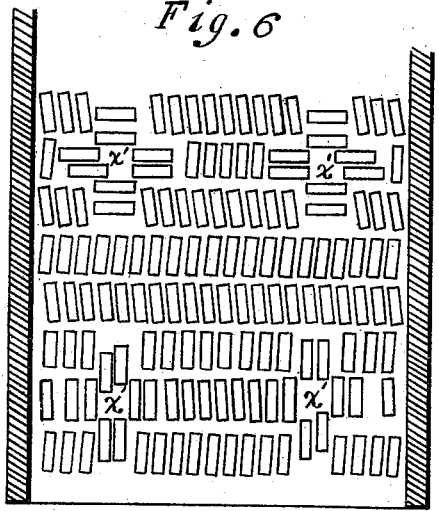

(No Model.)  7 Sheets—Sheet 1.
F. H. JUNG.
CHAMBER BRICK KILN.
No. 417,729.  Patented Dec. 24, 1889.
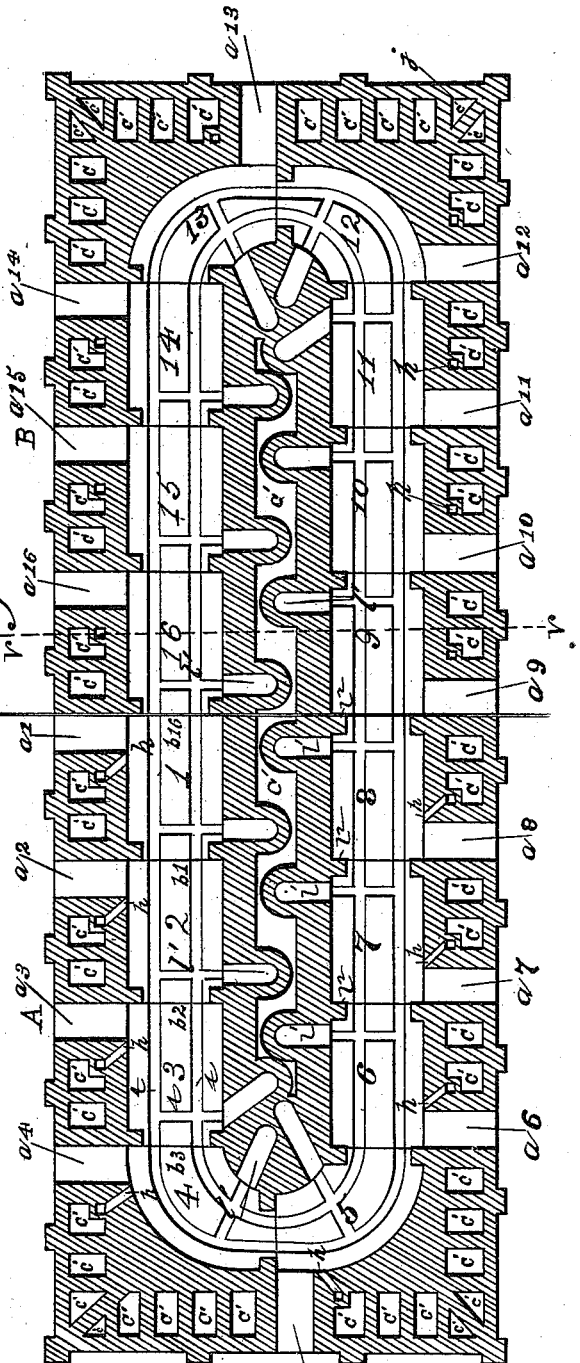
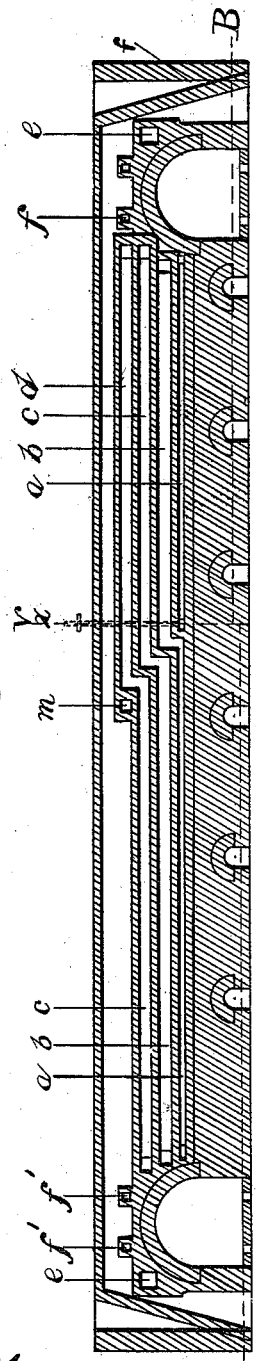
Witnesses.
Ida Linthicum
Wm T. Robertson
Inventor.
Frederick H. Jung.
by Price & Stewart for
Paul E. Richter atty (No Model.) 7 Sheets—Sheet 2.
F. H. JUNG.
CHAMBER BRICK KILN.
No. 417,729. Patented Dec. 24, 1889.
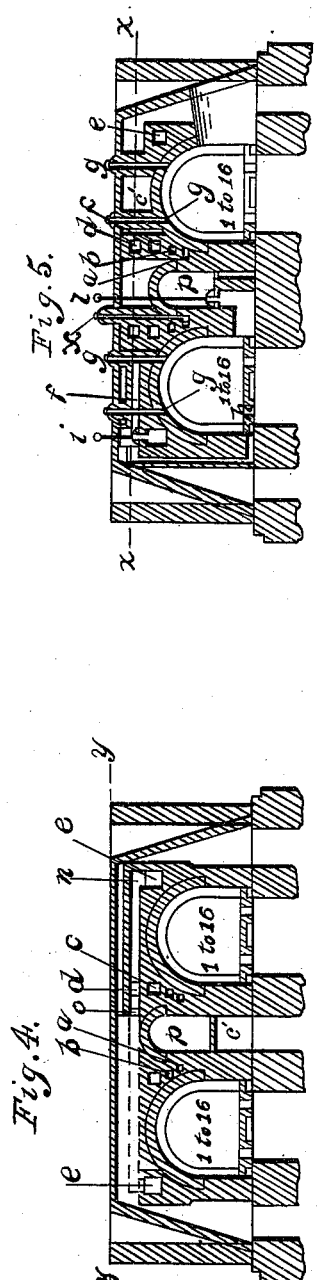
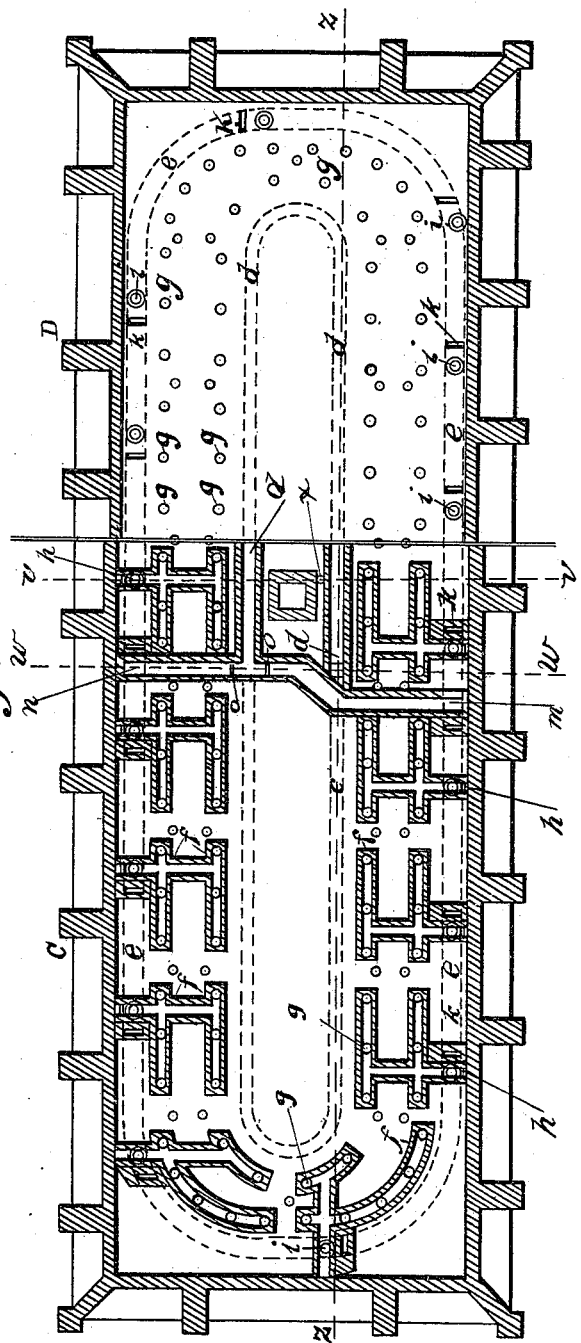
WITNESSES. INVENTOR.

(No Model.) 7 Sheets—Sheet 3.

F. H. JUNG.
CHAMBER BRICK KILN.

No. 417,729. Patented Dec. 24, 1889.

Witnesses.
Ida Linthicum
Wm T. Robertson

Inventor.
Frederick H. Jung.
By Paul E. Richter
by Price & Stewart
Asso Attys (No Model.)
F. H. JUNG.
CHAMBER BRICK KILN.
No. 417,729. Patented Dec. 24, 1889.
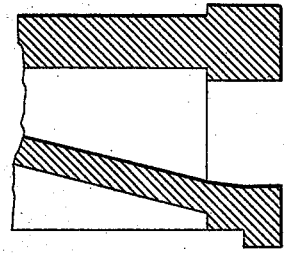
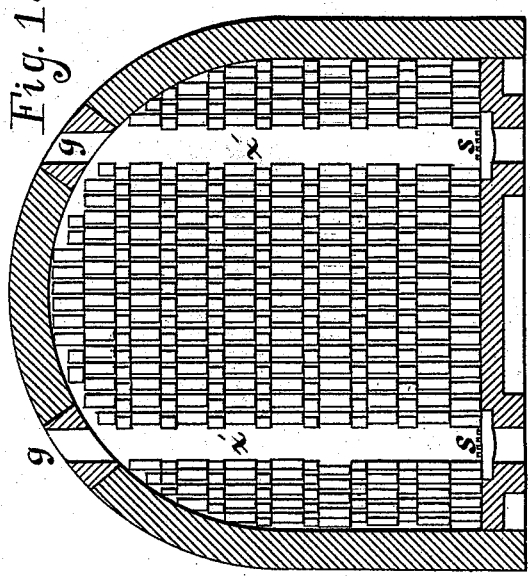
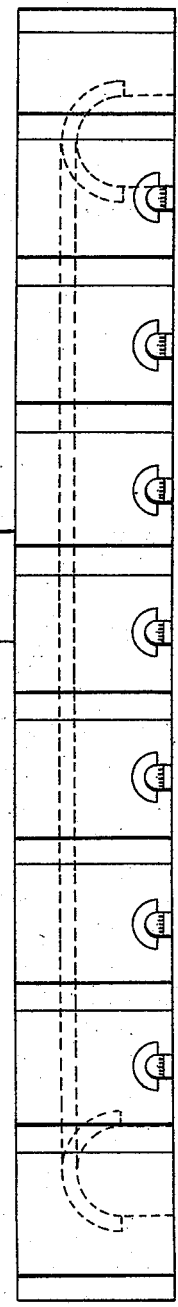
WITNESSES:
Ida Cruthiuum
Wm. T. Robertson
Fridrick N. Jung
INVENTOR
By Paul E. Richter
BY
Price & Stewart
Asso. ATTORNEYS (No Model.) 7 Sheets—Sheet 5.
F. H. JUNG.
CHAMBER BRICK KILN.
No. 417,729. Patented Dec. 24, 1889.
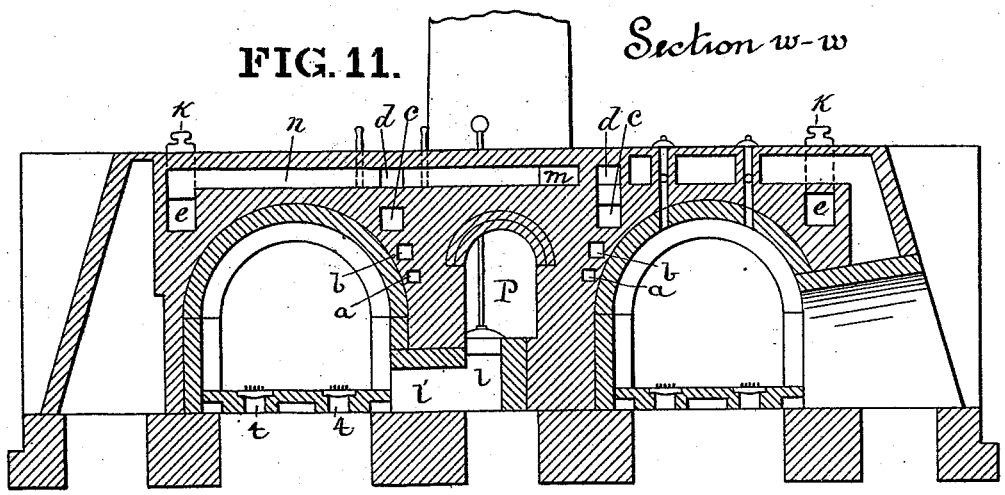
FIG. 11. Section w-w
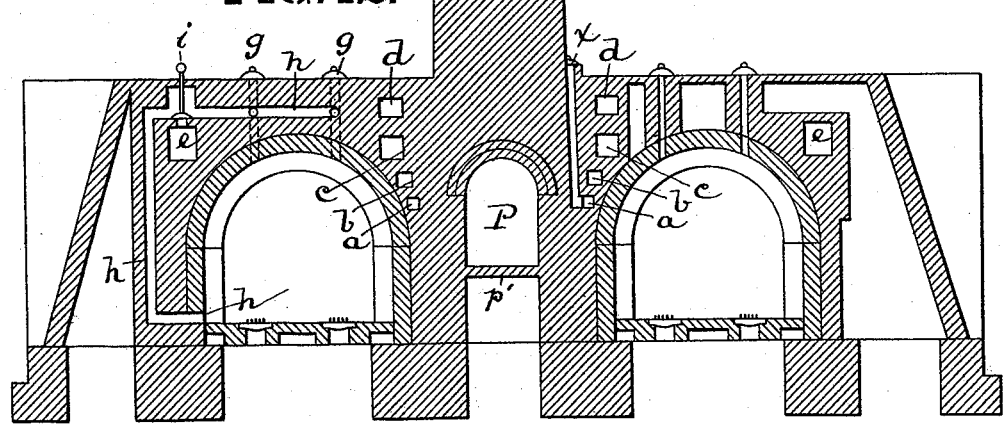
FIG. 12. Section v-v
FIG. 13. FIG. 14.
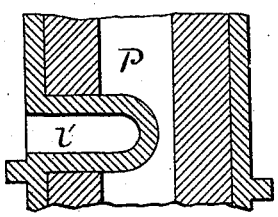
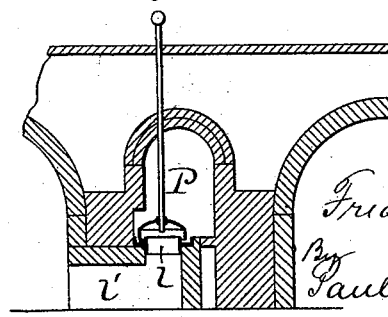
WITNESSES:
Ida Linthicum
Wm T. Robertson
Frederick H. Jung
Paul E. Richter
INVENTOR
BY Price & Stewart
ATTORNEYS (No Model.) 7 Sheets—Sheet 6.
F. H. JUNG.
CHAMBER BRICK KILN.
No. 417,729. Patented Dec. 24, 1889.
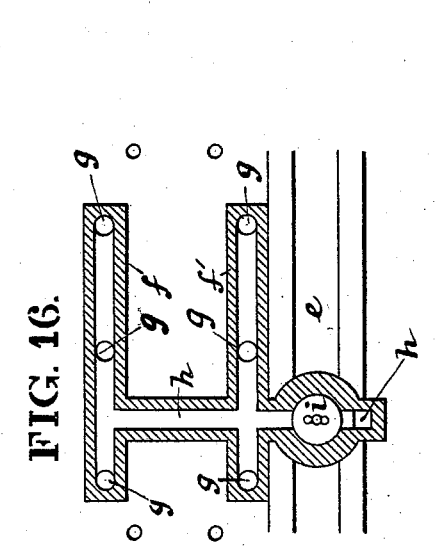
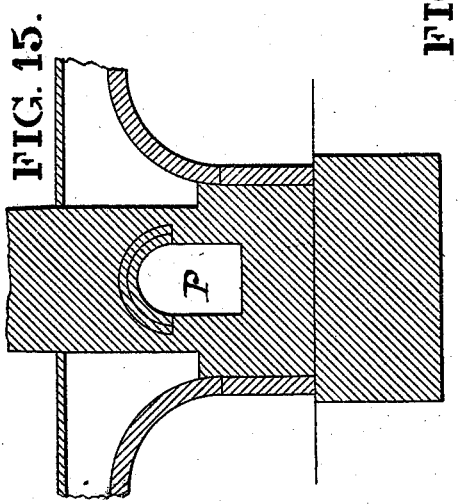
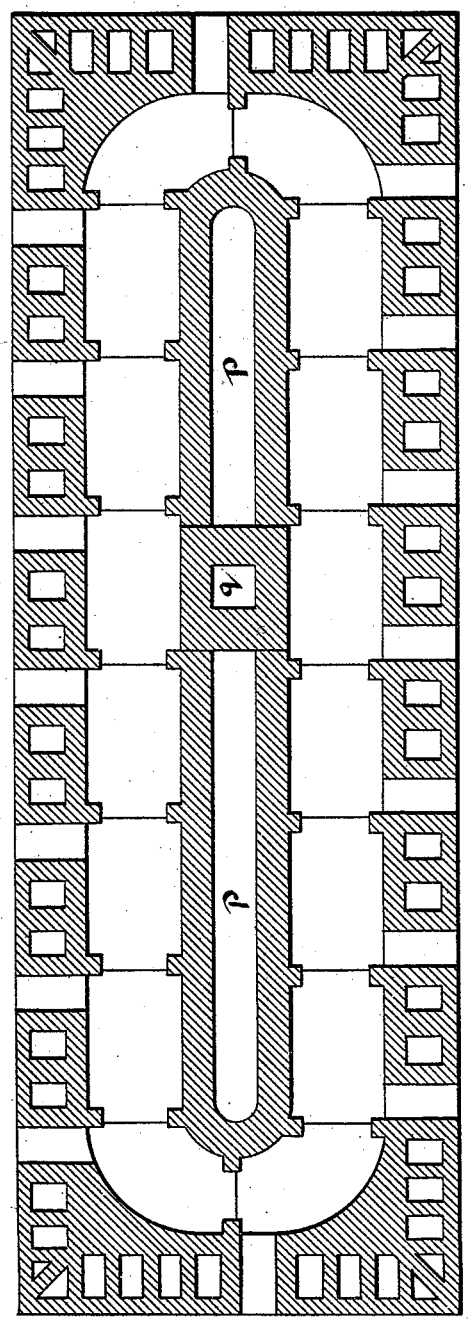
WITNESSES: INVENTOR:
Frederick H. Jung
BY Paul E. Richter
atty
By Price & Stuart
asso ATTORNEYS.

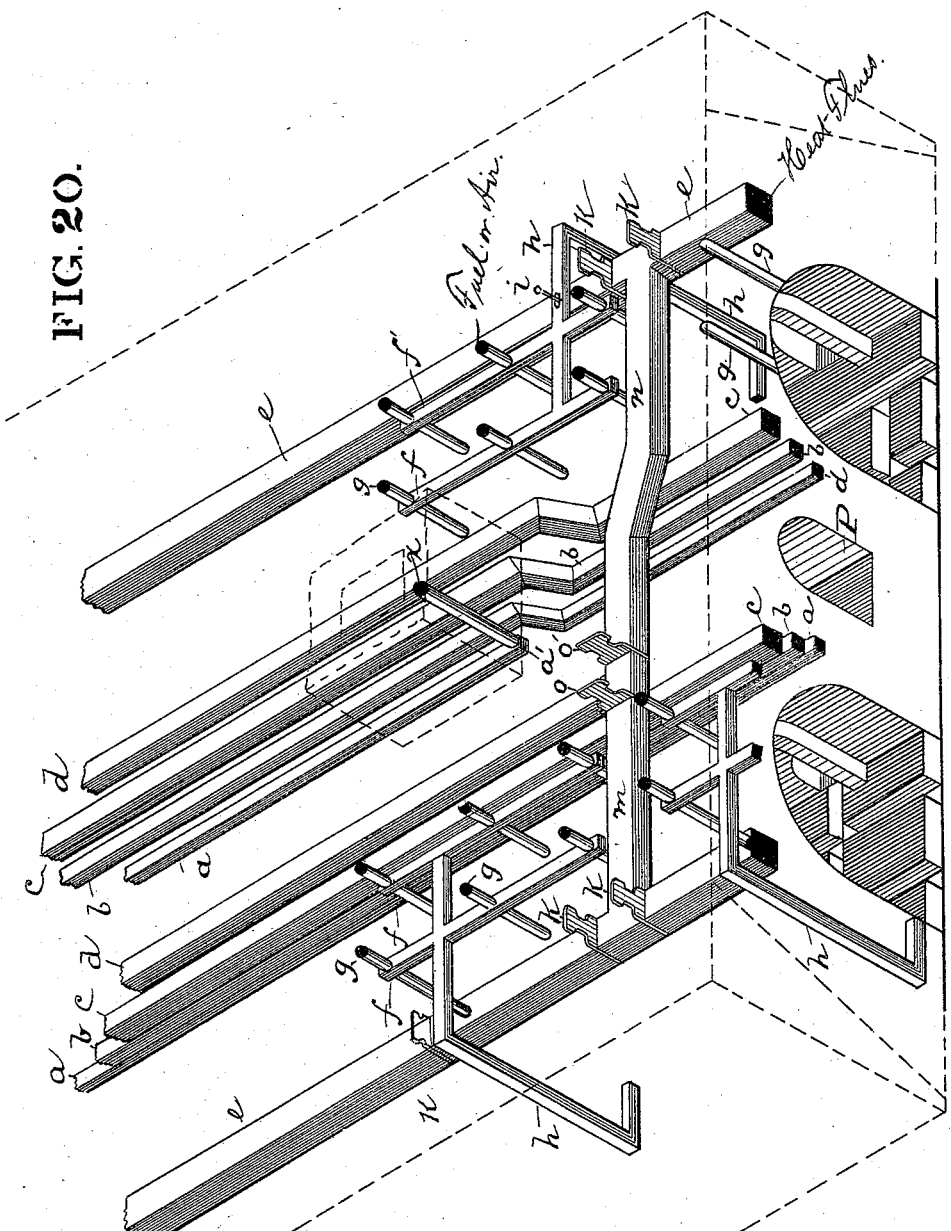

UNITED STATES PATENT OFFICE.

FREDERICK HERMANN JUNG, OF PARKSTONE, COUNTY OF DORSET, ENGLAND, ASSIGNOR TO PAUL ERNEST RICHTER, OF NEW YORK, N. Y.

CHAMBER BRICK-KILN.

SPECIFICATION forming part of Letters Patent No. 417,729, dated December 24, 1889.

Application filed June 14, 1889. Serial No. 314,282. (No model.) Patented in England November 2, 1888, No. 14,914.

*To all whom it may concern:*

Be it known that I, FREDERICK HERMANN JUNG, a citizen of Great Britain, and a resident of Parkstone, county of Dorset, England, have invented a certain new and useful Improvement in Chamber-Kilns, of which the following is a complete specification.

The invention described in this application has been patented by me in Great Britain on November 2, 1888, which said Letters Patent are numbered 14,914 of 1888.

My invention relates to kilns suitable for burning of brick, tiles, pipe, and pottery, and has for its object the economical and rapid burning of the same by utilizing the products of combustion as well as the heat generated by the fire employed to burn the brick or other material for the purpose of heating air, which is subsequently led through chambers containing green brick or other things made of clay, whereby they are dried and thus prepared for firing.

The structure described in this specification and illustrated in the drawings is one in which I accomplish first the drying of the brick by heated air and the subsequent burning of that brick by fire without removing it from the position in which it is first placed.

My kiln is constructed with a series of chambers communicating with one another, but arranged so that they may be separated by suitable partitions, and any number of these chambers may be used for firing and any number for drying, while at the same time one or more chambers may be separated from the others and opened, so as to be emptied of burned brick and refilled with green brick without stopping the firing and drying operations which are going on in other parts of the kiln. Each chamber is made independent of all the others by an arrangement of flues, dampers, and shutters, which enable me to throw into any chamber which I may select all or any portion of the heated air which is produced by the fire in other chambers.

Figure 7:
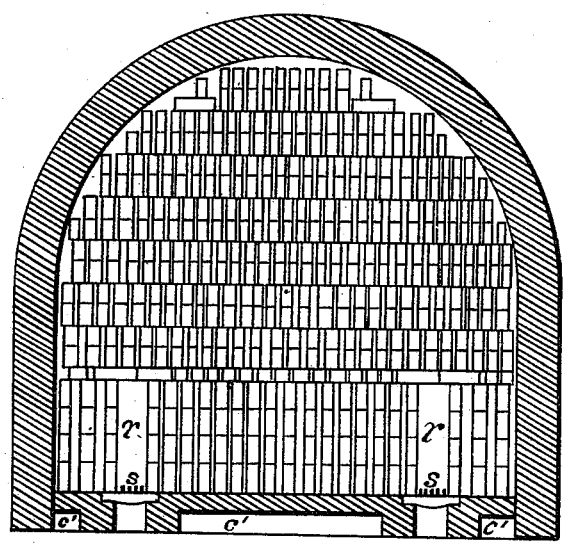
Figure 8:
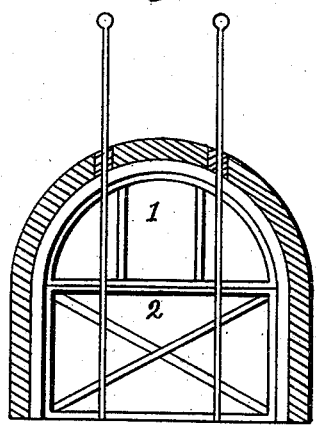
Figure 9:
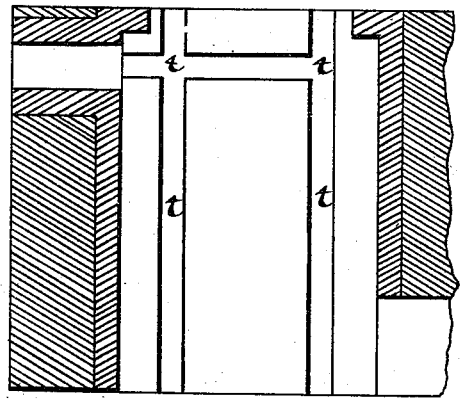

In the drawings, Figure 1 is a horizontal sectional view of my kiln. This figure is divided into two parts. The part A is a horizontal section taken at the floor of the kiln on the line marked A in Fig. 3, and the other part (marked B) is a similar horizontal section taken about a foot above the floor of the kiln at the line marked B, Fig. 3. Fig. 2 shows two horizontal sectional views of my kiln. Part C is a section taken through the horizontal plane $x$ $x$ of Fig. 5. The part marked D is a horizontal section of the top of the kiln through the line $y$ $y$, Fig. 4. This view is sectional only so far as the external walls are concerned, which rise a little above the level of the top of the kiln, or if they are no higher than the top of the kiln this view would represent a top view of one end of the kiln. Fig. 3 is a vertical longitudinal section of my kiln, taken through the line $z$ $z$, Fig. 2. Fig. 4 is a vertical section of my kiln, taken through the lines $w$ $w$ of Fig. 2, looking in the direction from the top toward the bottom of the drawing. Fig. 5 is a vertical sectional view of my kiln, taken through the lines $v$ $v$, Fig. 2, looking from the bottom toward the top of the drawing. Fig. 6 is a plan view of the floor of the kiln-chamber, showing the arrangement of the bricks upon it, so as to leave the fire-feeding holes $x'$ $x'$ through the bricks when piled in the kiln. Fig. 7 is a vertical transverse section of one of the kiln-chambers full of bricks piled so as to leave the fire-spaces $r$ $r$ therein, and showing the grate $s$ $s$ and bearing-bars upon which they rest and the ash-channels below them. Fig. 8 is a vertical transverse section of one of the chambers of my kiln, showing the partition-door which is used to divide one chamber from the other. Fig. 9 is a plan of a part of the floor of one of the chambers of my kiln, showing the arrangement of the ash-channels therein. Fig. 10 is a full external side elevation of the kiln. Fig. 11 is a vertical transverse section of the kiln through the line $w$ $w$, Fig. 2, looking from the bottom toward the top of the drawing of that figure. Fig. 12 is an enlarged view of Fig. 5. It differs somewhat from that figure in being an exact section. Fig. 13 is a horizontal section of the smoke-flues, by means of which the chambers of the kiln communicate with the main smoke-flue and the stack. Fig. 14 is a vertical transverse section of the main smoke-flue, the chamber smoke-flue shown in Fig. 13, and the damper by which the communication between them is made or closed. Fig. 15 is a vertical transverse section of the center of the kiln, taken through the stack and showing its foundation and the main smoke-flue. Fig. 16 is a horizontal section of certain heat-flues which are arranged above each chamber of the kiln. Fig. 17 is a ground plan of the kiln. Fig. 18 is a vertical transverse section of one of the chambers of the kiln, showing the arrangement of brick of the interior thereof in relation to the fire-feeding holes in the top of the chamber. Fig. 19 is a section of the abutment and battering-walls of the kiln and their foundations. Fig. 20 is a perspective view of a portion of the kiln, representing it as transparent, the outline of the kiln being in dotted lines, and the spaces in the brick-work which constitute the chambers and the flues being in full lines and showing their relative positions in the way in which they are protected and communicated with one another.

In the construction of my kiln its permanent character makes it necessary that great care should be taken to make the foundation solid and substantial.

Figures 15, 17, and 19 will illustrate the method of constructing the foundation for the kiln and the stack. The stack is placed nearer one end than the other, so as to enable me to divide the kiln satisfactorily into chambers of equal size. The exterior wall is built, as shown in Fig. 19, with an inclined battering-wall on the exterior of it and tie-walls connecting the battering-wall with the external wall of the kiln. The interspace between the external wall of the kiln and the battering-wall is filled with earth, or, if it is desired to construct the whole in masonry, it may be done. As the brick-work rises above the foundation the channel-ways (shown in Fig. 1, part A) which constitute the flues must be constructed. The channel-ways and vertical flue $h\ h\ h'\ h'$ must be constructed in the exterior wall of the kiln at a level above the foundation, which will permit the channel to enter the kiln above the level of the fire-floor. The fire-floor must then be laid with its channels $t\ t\ t$ therein, which are shown in Figs. 1, 9, and 11. Two of these channels run lengthwise of the chamber parallel to each other and to the sides of the chamber and communicate with one another. There is also a transverse channel $t$, connecting the longitudinal channels with one another and also with the chamber smoke-flue $l'$. Leading from each chamber of the kiln into the inner space between the chambers on either side of the kiln are the flues $l'\ l'\ l'$, which are shown in section in Figs. 11 and 14 and in an enlarged plan in Fig. 13. These flues are arched over at about a foot from the flooring-kiln, except at their anterior ends, where they open upward into the main smoke-flue P. Each chamber is provided with a man-inlet arch, communicating with the exterior of the kiln, and through which the chambers may be filled and emptied. These arches are numbered $a'$, $a^2$, and $a^3$, &c., to $a^{16}$.

The kiln is divided into sixteen chambers, each having an external opening and a chamber smoke-flue $l'$. The chambers are marked, respectively, 1, 2, 3, 4, &c., to 16. As the construction of the kiln ascends, the floor $p'$ is constructed across the space between the interior walls of the chambers, so as to make a floor for the main smoke-flue P, and the points at which the chamber smoke-flues $l'\ l'\ l'$ perforate this floor must be provided with a damper constructed as shown in Fig. 14. A cast-iron cylinder or ring is provided on its exterior with a laterally-extending flange having an upwardly-turned edge, so as to leave a circular channel-way around the exterior of the upper end of the cylinder. The cylinder is placed in the hole in the floor $p'$. The channel surrounding the top of the cylinder is filled with sand, and a cast-iron cover or lid of such a size as to fit said channel and rest upon the same is placed over the upper end of the cylinder, forming a damper $l$. This cover is provided with a rod secured to the top and protruding up through the top of the kiln, by which the damper may be operated from the roof of the kiln. The walls of the kiln, both outside and inside, are now raised until the spring of the chamber-arches is reached, the flues $h\ h$ in the external wall being continued vertically. The arches of the chambers are then put in, the interior course being of fire-brick and the balance of ordinary brick. At the extremity of each chamber a door jamb or frame is constructed, also of fire-brick, against which the door rests by which the chambers are separated. This jamb $l''$ is shown in section in Figs. 1 and 13 and in full view in Figs. 11 and 12. In the top of the arch of the chambers are inserted blocks of fire-brick, through which are holes $g\ g$, which, when the blocks are placed in position in the arches, are vertical. These blocks are set in pairs along the whole length of the kiln-chambers a short distance apart. The hole formed by these blocks is extended up through the brick-work of the ceiling of the kiln to its upper surface. Through these apertures (better shown in Fig. 20) the fire in the kiln may be fed, after it gets thoroughly started, from the top of the kiln. They are provided with covers by which they may be closed on the roof. The center main smoke-flue is then arched and the stack constructed up to the level of the roof. The interspace between the top of the chamber-arch on its exterior and the roof of the kiln contains a series of flues, which are constructed as will be hereinafter described, which connect with one another, and are so arranged that the heat of the fire on the interior of any one or more of the kiln-chambers will heat the air contained in said flue and cause it to travel through them and be delivered at any point where it is needed or desired for any purpose, either to serve as draft for the kiln-fire or for the purpose of drying green brick which may be contained in any one or more chambers of the kiln. These flues are provided with dampers so arranged that the hot air may be delivered to any one or more of the kiln-chambers. As before stated, the vertical flues $h$ $h$, which enter each chamber on the level of the fire-floor and then ascend through the external wall of the kiln, rise to a level somewhat above that of the top of the chamber-arches and then extend horizontally toward the center of the kiln at right angles to the axis of the kiln-arch as far as the inner lines of the fire-feeding holes $g\ g$.

The above construction will be seen by reference to Fig. 12. Referring to the same figure, $e$ is the main heat-flue, which encircles the whole kiln and is located just outside the wall of the kiln-arch, on the outside of the kiln and immediately above the exterior vertical wall of the chamber, and on a level with the top of the kiln-arch. The flue $h$, above described, rises from the floor of the kiln vertically outside of the flue $e$, then crosses over the top of the flue $e$ toward the center of the kiln. It will be observed that as there are sixteen chambers in the kiln there will be sixteen of the flues $h$. At the point where the flue $h$ crosses above the flue $e$ a passage-way is constructed, connecting them with one another, and a damper is placed in the flue $h$ over said passage-way and provided with a handle $i$, which protrudes through the roof of the kiln, and by which the flue $h$ may be thrown into communication with the flue $e$ or cut off from it.

Referring to Figs. 16 and 20, these figures show the detail of construction just described with others. Every three fire-feeding holes in the same line are connected together by flues $f$ and $f'$, which are closed at the end, but which are in the same horizontal plane as flue $h$, and which are connected together by it. It will thus be seen that when the fire-feeding flues $g$ are not employed for the purpose of feeding the fire in the chamber below them with fuel they may be closed at the top, and they will form a passage-way through which hot air may travel from the top of the kiln, through the flues $f\ f'$, into $h$, down through the flue $h$ to the bottom of the kiln, and back through the kiln to the top again; or, if the damper $i$ be opened, so as to establish a communication between the top of the kiln-chamber and flue $e$, the products of combustion from the top of one kiln of the hot air therein contained may be drawn from that kiln and delivered into any other. Thus if it is desired, after a chamber full of bricks has been burned, to remove the bricks rapidly, they may be cooled down to a sufficient extent to make it possible to handle them by connecting the flue $e$ with the top of that chamber through $g$, $f$, and $h$, and through $h$ of another chamber, which is closed, so as to develop the draft of the stack, thence through that chamber, the chamber smoke-flue $l'$, its damper being open, and the main smoke-flue P to the stack. There are now four other flues employed for heating air, which are constructed in the masonry between the interior side of the chamber-arches and the arch of the smoke-flue P. These flues are four in number—$a$, $b$, $c$, and $d$. $a$ is the one lowest down. It starts at a point a short distance above the spring of the chamber-arch and close to it and just opposite the edge of the stack. Its extremity $a'$ is connected with the surface of the top of the stack by vertical flue $x$, through which it is supplied with air. The construction and location of this flue and the flue $x$, as well as the other flue described, will be best understood by reference to Fig. 20. The flue $a$ is continued in a horizontal plane all around the outside of the main smoke-flue P and against the interior wall of the chamber-kiln until it arrives at a short distance from the point at which it starts. It then rises and enters the flue $b$, which by reference to Fig. 12 will be seen to be immediately above it, but a little farther from the center of the kiln, about equal distance with it from the center of the chamber-arch. The flue $b$ then proceeds in the same manner as the flue $a$ and makes a complete revolution of the kiln, parallel to $a$, until it arrives at a short distance from the point at which it started. It then rises and joins the flue $c$, which is above it and a little farther away from the center of the kiln, but about equally distant with it from the center of the chamber-arch. The flue $c$ then proceeds horizontally and makes a complete circle of the kiln, retaining its relative position to the chamber-arch and to the other flues, until it arrives at a short distance from the point at which it started. It then rises vertically, as is shown in Fig. 11, and joins the flue $d$, which is immediately above it. The flue $d$ then proceeds on its horizontal plane parallel to the others, but makes only a half-detour of the kiln, ending at a point about opposite to where it began, above the chamber-arch on that side. Here it enters a transverse flue $m$, which is upon the same horizontal plane with it. The flue $m$ extends across the whole breadth of the kiln and connects the two sides of the flue $e$ at a point about equally distant from the two ends of the kiln. The flues $a$, $b$, $c$, and $e$ form one continuous passage-way without break or opening from the point $x$, where the flue $a$ comes to the surface of the top of the kiln, to where the flue $d$ joins the transverse flue $m$. The transverse flue $m$, on either side of the point at which the flue $d$ enters, is provided with dampers $o$ and $o'$, and on either side of the point at which said flue $m$ enters the flue $e$, one end of it entering on one side of the kiln and the other end entering on the other side of the kiln. Said flue $e$ is provided with dampers $k\ k$. It will thus be seen that the air entering at $x$, carried through the flues $a$, $b$, $c$, and $e$, heated while passing through them, and then delivered into the flue $m$, may by the dampers $o$ or $o'$ be turned so as to flow to one side or the other of the kiln, as desired, and that whichever way it goes it may be made to flow up or down the flue $e$ by the dampers $k\ k$, either of which may be withdrawn, and as it passes down the flue $e$ it may be diverted and caused to flow into $h$ and down into the bottom of any chamber by closing the damper $k$ on the far side of the damper $h$, through which it is desired to make it flow, and opening the damper $i$ of that flue.

Referring to Fig. 15, it will be observed that the main smoke-flue P passes through the center of the smoke-stack. The chamber-arches are divided into independent chambers by means of the shutters $b'$ to $b^{16}$. (Shown in Fig. 8.) These shutters are arranged to bear against the door-jambs shown in Figs. 1, 9, &c. These shutters are connected by rods, which pass up through the top of the kiln. The shutter is generally arranged in two parts, hinged together, and may be wholly or partially removed from the exterior of the kiln by means of the rods, so as to throw one compartment into communication with another from the exterior of the kiln.

In the operation of my kiln the bricks are packed in the kiln, as shown in Figs. 6, 7, and 18, leaving flues or passage-ways through the brick, such as are there shown, horizontal passage-ways $r\ r$ over the grates, and vertical passage-ways $x'\ x'$ under the fire-feeding holes. If the bricks are already dry and are packed into the chambers—say those chambers indicated by the numbers 2, 3, 4, and 5—the chamber-doors (shown in Fig. 8) having been removed, except the chamber door or shutter between the chambers 5 and 6, which is put into position between said chambers, the external doorways or man-inlet arches of the chambers 2, 3, 4, and 5—that is to say, $a^2$ to $a^5$—are then closed by a temporary wall. The dampers $l$ of the chambers 2, 3, and 4 are closed, while that of chamber 5 is left open. A fire is then built by entering the chamber 1 in the flues $r\ r$, as shown in Fig. 7, upon the grates $s\ s$, said flues $r\ r$ being extended through the bricks as arranged in the kiln, so as to stand immediately above the ash-channels $t\ t$, as shown in Fig. 9, and communicate with the chamber smoke-flue $l'$. The draft of the fire built in chamber 2 will then have to travel (the dampers 2, 3, and 4 being closed) through said chambers to the chamber 5, in order to escape by the smoke-flue of that chamber into the main smoke flue and stack. The fire thus built is kept going for a number of hours, and is gradually increased until an examination through the fire-feeding holes of the chambers 3, 4, and 5 indicates that they are hot enough to rapidly consume such fuel as may be fed into them through the fire-feeding holes $g\ g$ in their roof. Fuel introduced through these fire-feeding holes $g\ g$ will fall through the flues or pockets $x'\ x'$ into the fire-channels $r\ r$, where, the fire being hot enough to at once consume the fuel, a very intense heat will be created. This fire is continued and fed from above until the bricks in said chambers 2, 3, 4, and 5 are completely burned.

While the operation of burning the brick contained in the four chambers just mentioned is going on the chambers 7, 8, 9, and 10 are filled with green brick and a fire door or shutter—such as is shown in Fig. 8—is placed so as to close the opening between the chambers 6 and 7. Another is placed so as to close the opening between the chambers 10 and 11. The entrance-arches $a^7$, $a^8$, $a^9$, and $a^{10}$ are then closed by temporary walls. I then open the damper $l$ of chamber 10, those of the chambers 7, 8, and 9 being closed. The damper covering the flue $x$, leading to $a$, is then opened, the damper $o'$ in the flue $m$ closed, damper $o$ in the same flue opened, damper $k$, on the side next to the chamber 1, is opened and that on the other side is closed, and all the intermediate dampers $k\ k\ k$ in the flue $e$ are opened until the damper $k$ which is beyond the flue $h$ of chamber 10 is reached. That one is closed. All of the dampers $i\ i\ i$, which control the communication between the flue $e$ and the flues $h$, are closed, except those of the chambers 7, 8, 9, and 10, which are opened. It will thus be seen that the air entering $x$ and $a$ will travel through $a$, pass the chambers containing the fire, where it will be heated, thence into the flue $b$, in which it will travel the second time, pass the fire, and will be more heated, and thence in the flue $c$, into which it will a third time pass the fire and be still more heated, thence into the flue $d$, and from that into the flue $e$, in which it will a fourth time pass the fire and be heated, and then when very hot it will be delivered through $h$ of the chambers 7, 8, 9, and 10 into these chambers at their floor-level, will pass from one to the other, and be carried off through the smoke-flue $l'$ of chamber 11 into the main smoke-flue P, and thence to the stack. The draft of the stack will maintain the current.

While the above-described operations are in progress the chambers 12 13 14 15 are being packed with green brick or other material to be burned and prepared for the drying process. By the time this is accomplished the chambers 2, 3, 4, and 5 will be finished. The fire will then be drawn from them and the brick removed. While they are cooling, so as to remove the brick from them, time may be saved by packing chamber 1 with brick to be dried. Fire may at the same time be built in the chamber 6, and the chambers 7, 8, 9, and 10 fired, the dampers having been previously arranged, as described above, so as to throw the heated air at its highest attainable temperature into the chambers 12, 13, 14, and 15 and through the smoke-flue of chamber 15 into the stack. Next time the fire is built it will be done through chamber 11 and under the brick in chamber 12. The next time it will be built through chamber 16 under the brick in chamber 1, and chambers 1 2 3 4 will be fired, and so on.

Having thus described my invention, what I claim is—

1. In a chamber-kiln, the combination of a series of chambers arranged one after the other, so that each chamber communicates with that on either side of it, and so located that the last chamber communicates with the first, each chamber being provided with means by which it may be separated from all others, and each chamber being connected by a smoke-flue with a stack, said smoke-flue being provided with a damper by which the communication between the chamber and stack may be cut off or regulated, and a series of heated flues arranged in close proximity to said chambers, connected to one another, and provided with dampers by which a current of air may be caused to pass through said flues, be heated therein, and then delivered to any one or more of the chambers as desired, substantially as described.

2. In a chamber-kiln, the combination of a series of chambers arranged one next to the other, so that each chamber communicates with that on either side of it, and so located that the last chamber communicates with the first, each chamber provided with means by which it may be separated from the other, and each chamber being connected by a smoke-flue with a stack, said smoke-flue being provided with a damper, by which the communication between the chamber and the stack may be cut off or regulated, and a series of hot-air flues arranged in close proximity to the said chambers, connected to one another, and terminated in a main heat-flue, which is connected by an independent flue with each chamber and is provided with a series of dampers, by the arrangement of which the hot air may be delivered into any one or more chambers, as desired.

3. In a chamber-kiln, the combination of a series of chambers arranged one after the other, so that each chamber communicates with that on either side of it, and so located that the last chamber communicates with the first, each chamber being provided with means by which it may be separated from the others, each chamber being connected by a smoke-flue with a stack, said smoke-flue being provided with a damper by which the communication between the chamber and the stack may be cut off or regulated, and a series of air-flues arranged in close proximity to the chamber-arches on the side next the stack, connected to one another and open to the air at one end, and connected to a main hot-air flue which encircles the kiln on the outside of the chamber-arches, said outside flue being provided with dampers and a branch flue leading to each chamber, through which a current of heated air may be delivered to any one or more of the chambers, as desired.

FREDERICK HERMANN JUNG.

Witnesses:
ARTHUR STEUART,
BENJN. PRICE.